US009239242B2

(12) United States Patent
Okude et al.

(10) Patent No.: US 9,239,242 B2
(45) Date of Patent: Jan. 19, 2016

(54) ROUTE CALCULATION SYSTEM, NAVIGATION DEVICE, AND ROUTE CALCULATION METHOD

(71) Applicant: Clarion Co., Ltd., Saitama-shi, Saitama (JP)

(72) Inventors: Mariko Okude, Tokyo (JP); Masatoshi Kumagai, Tokyo (JP); Tomoaki Hiruta, Tokyo (JP); Shinichi Amaya, Saitama (JP)

(73) Assignee: Clarion Co., Ltd., Saitama-shi (JP)

( * ) Notice: Subject to any disclaimer, the term of this patent is extended or adjusted under 35 U.S.C. 154(b) by 0 days.

(21) Appl. No.: 14/420,475

(22) PCT Filed: Aug. 1, 2013

(86) PCT No.: PCT/JP2013/070881
§ 371 (c)(1),
(2) Date: Feb. 9, 2015

(87) PCT Pub. No.: WO2014/024773
PCT Pub. Date: Feb. 13, 2014

(65) Prior Publication Data
US 2015/0198449 A1 Jul. 16, 2015

(30) Foreign Application Priority Data

Aug. 10, 2012 (JP) .................................. 2012-178785

(51) Int. Cl.
*G01C 21/34* (2006.01)
*G08G 1/01* (2006.01)
(Continued)

(52) U.S. Cl.
CPC ............ *G01C 21/34* (2013.01); *G01C 21/3492* (2013.01); *G08G 1/00* (2013.01);
(Continued)

(58) Field of Classification Search
USPC ........................................................ 701/408
See application file for complete search history.

(56) References Cited

U.S. PATENT DOCUMENTS 6,317,686 B1 * 11/2001 Ran ..................... G01C 21/3691
701/117
9,140,567 B2 * 9/2015 Fryer .................. G01C 21/3407
(Continued)

FOREIGN PATENT DOCUMENTS

JP 2000-283780 A 10/2000
JP 2009-2817 A 1/2009
(Continued)

OTHER PUBLICATIONS

International Search Report dated Oct. 1, 2013 with English translation (three (3) pages).

*Primary Examiner* — Shelley Chen
(74) *Attorney, Agent, or Firm* — Crowell & Moring LLP (57) ABSTRACT

A route calculation system includes: a route selection probability calculation unit that calculates a route selection probability of each route; a weighting parameter acquisition unit that acquires at least two kinds of weighting parameters representing degrees of influences of at least a route traveling distance and a route traveling time on the route selection probability; a weighting parameter selection unit that selects at least two kinds of weighting parameters corresponding to a specified set of a starting point and ending point combination related to a combination of a departure point and a destination; and a recommended route calculation unit that calculates a recommended route based on at least two kinds of link costs including a link traveling distance and a link traveling time and based on the at least two kinds of weighting parameters corresponding to the specified set of the starting point and ending point combination.

9 Claims, 8 Drawing Sheets

(51) Int. Cl.
*G08G 1/0968* (2006.01)
*G08G 1/00* (2006.01)
*G08G 1/137* (2006.01)

(52) U.S. Cl.
CPC ........... *G08G 1/0112* (2013.01); *G08G 1/0129* (2013.01); *G08G 1/0141* (2013.01); *G08G 1/09685* (2013.01); *G08G 1/096827* (2013.01); *G08G 1/137* (2013.01)

(56) References Cited

U.S. PATENT DOCUMENTS

2006/0116815 A1* 6/2006 Nomura ............. G01C 21/3415
 701/417
2008/0319645 A1 12/2008 Kumagai et al.
2009/0048775 A1 2/2009 Okude et al.
2011/0137834 A1 6/2011 Ide et al.
2013/0066548 A1* 3/2013 Gruen et al. ....... G01C 21/3617
 701/410
2013/0184992 A1 7/2013 Osogami
2013/0204525 A1* 8/2013 Pfeifle ................ G08G 1/09626
 701/533

FOREIGN PATENT DOCUMENTS

| | | |
|---|---|---|
| JP | 2009-42051 A | 2/2009 |
| JP | 2011-118777 A | 6/2011 |
| JP | 2013-148390 A | 8/2013 |

* cited by examiner

| REGISTRA-TION ID | DEPARTURE POINT O | DESTINATION D | DISTANCE BETWEEN OD | INTER-NODE AVERAGE DISTANCE [m] | ADJUSTMENT COEFFICIENT $\alpha_0$ | WEIGHTING PARAMETER FOR DISTANCE $\alpha_1$ | WEIGHTING PARAMETER FOR TRAVELING TIME $\alpha_2$ | WEIGHTING PARAMETER FOR TYPE OF ROAD $\alpha_3$ | ... |
|---|---|---|---|---|---|---|---|---|---|
| 1 | 5440441234 | 5440453344 | 22 | 300 | -10 | 0.5 | -2 | -0.5 | |
| 2 | 5440340022 | 5440356543 | 56 | 400 | -15 | 1.7 | -7 | -1.4 | |
| 3 | 5339453421 | 5339361122 | 35 | 200 | -8 | -3 | 0.5 | -0.2 | |
| ... | | | | | | | | | |

ROUTE CALCULATION SYSTEM, NAVIGATION DEVICE, AND ROUTE CALCULATION METHOD

TECHNICAL FIELD

The present invention relates to a route calculation system, a navigation device and a route calculation method, each of which calculates a route based on probe data acquired by a center.

BACKGROUND ART

Data collected by a probe car has been used in searching a recommended route for a vehicle when it travels on a road. The probe car is a vehicle that includes on-board various devices such as various sensors and a communication device, collects data such as vehicle location, travel speed, travel distance, route information (hereafter, referred to as "probe data") and transmits the collected probe data to a predetermined server. In many cases, the probe car used is a commercial vehicle such as a taxi or a truck, or a private car. In recent years, it has become possible to collect probe data by executing an application programmed to collect probe data with a multi-functional mobile phone (smartphone) and transmit the collected probe data to a server.

On the other hand, a route search technology for providing an optimal route to a destination is a basic function of a navigation device. Such a technology commonly uses a method of calculating a route along which the amount of time required or traveling distance from the departure point to the destination is minimal. However, such a recommended route may include a road that is not used by the local people, such as a narrow road or a road having poor visibility. This causes a desire for a route that is selected taking into consideration not only time and distance but also comfort and safety.

Patent literature 1 discloses a method of executing a route search by detecting a crossing, at which many vehicles branch off, as a main branching node, based on a plurality of pieces of travel history data obtained from the probe data, preparing a probe section having the main branch node as an ending point, and executing a route search using this probe section. According to the teaching of the Patent literature 1, constructing road links based on the driver's actual travel records naturally results in selecting a series of road links that follow any road link, along which the driver has traveled, as a recommended route, and thus enables preparing and providing a recommended route which reflects the know-how concerning route selection by the driver who has traveled similar road areas.

Patent literature 2 discloses a technology for searching a route, which involves classifying a plurality of pieces of travel history data obtained from probe data by categories including driver information, vehicle information, purpose of travel, setting a link cost by calculating, by category, ratios of links along which travels are made assuming that a plurality of pieces of travel history data classified into the same category are treated as the pieces of the travel history data relative to drivers having the same liking in route selection, and searching a route with placing priority to the link along which the drivers having the same liking have traveled. Patent literature 2 states that a driver uses the route selection know-how of other drivers who have the same purpose or liking as that of the driver, he can get a route which is created in consideration of his liking.

CITATION LIST

Patent Literature

Patent literature 1: Japanese Laid Open Patent Publication No. 2009-2817
Patent literature 2: Japanese Laid Open Patent Publication No. 2009-42051

SUMMARY OF INVENTION

Technical Problem

Although the method disclosed in the Patent literature 1 is effective for roads each having a plurality of pieces of probe data therefor, but it fails to create probe sections for roads each having no such probe data or for roads each having poor probe data so that degrees of branching of cars streams at crossings are unclear. This leads to a failure of providing recommended routes reflecting the drivers' route selection know-how.

The method disclosed in the Patent literature 2 has a similar problem to that of the method disclosed in Patent literature 1. Although the method disclosed in the Patent literature 2 is effective for roads having a plurality of pieces of probe data, it fails to set a link cost based on travel ratios for roads for which no probe data is available. This results in a failure of providing recommended routes reflecting the route selection know-how of the drivers.

Solution to Problem

According to the 1st aspect of the present invention, a route calculation system comprises: a route selection probability calculation unit that calculates a route selection probability of each route of a plurality of routes based on a number of trajectories included in the each route among a plurality of trajectories corresponding to probe data and based on a number of trajectories each having a starting point and an ending point which are substantially identical with a starting point and an ending point of the each route, among the plurality of trajectories; a weighting parameter acquisition unit that acquires at least two kinds of weighting parameters based on a route traveling distance and a route traveling time along each of the routes, the route traveling distance and the route traveling time being obtained based on the probe data, and based on the route selection probability, the at least two kinds of the weighting parameters representing degrees of influences of at least the route traveling distance and the route traveling time on the route selection probability, for each of a plurality of sets of starting point and ending point combinations; a weighting parameter selection unit that selects at least two kinds of weighting parameters corresponding to a specified set of a starting point and ending point combination related to a combination of a departure point and a destination among the plurality of sets of starting point and ending point combinations each related to the at least two kinds of weighting parameters; and a recommended route calculation unit that calculates a recommended route based on at least two kinds of link costs including a link traveling distance and a link traveling time related to each road link of a plurality of road links in an area that includes the departure point and the destination and based on the at least two kinds of weighting parameters selected by the weighting parameter selection unit corresponding to the specified set of the starting point and ending point combination.

According to the 2nd aspect of the present invention, a route calculation method comprises: calculating a route selection probability for each route of a plurality of routes based on a number of trajectories included in the each route among a plurality of trajectories corresponding to probe data and based on a number of trajectories each having a starting point and an ending point which are substantially identical with a starting point and an ending point of each of the each route, among the plurality of trajectories; acquiring at least two kinds of weighting parameters based on a route traveling distance and a route traveling time along each of the routes, the route traveling distance and the route traveling time being obtained based on the probe data, and based on the route selection probability, the at least two kinds of weighting parameters representing degrees of influences of at least the route traveling distance and the route traveling time on the route selection probability, for each of a plurality of sets of starting point and ending point combinations; selecting at least two kinds of the weighting parameters corresponding to a specified set of a starting point and ending point combination related to a combination of a departure point and a destination among the plurality of sets of starting point and ending point combinations each related to the at least two kinds of weighting parameters; and calculating a recommended route based on at least two kinds of link costs including a link traveling distance and a link traveling time related to each road link of road links in an area that includes the departure point and the destination and based on the at least two kinds of the weighting parameters selected corresponding to the specified set of the starting point and ending point combination.

Advantageous Effects of Invention

The present invention enables one to provide a route suitable for a practical use that reflects the route selection knowhow of drivers and thus solve dissatisfaction of drivers concerning route guidance, no matter whether probe data is available or not.

DESCRIPTION OF EMBODIMENTS

Whole Construction

Figure 1:
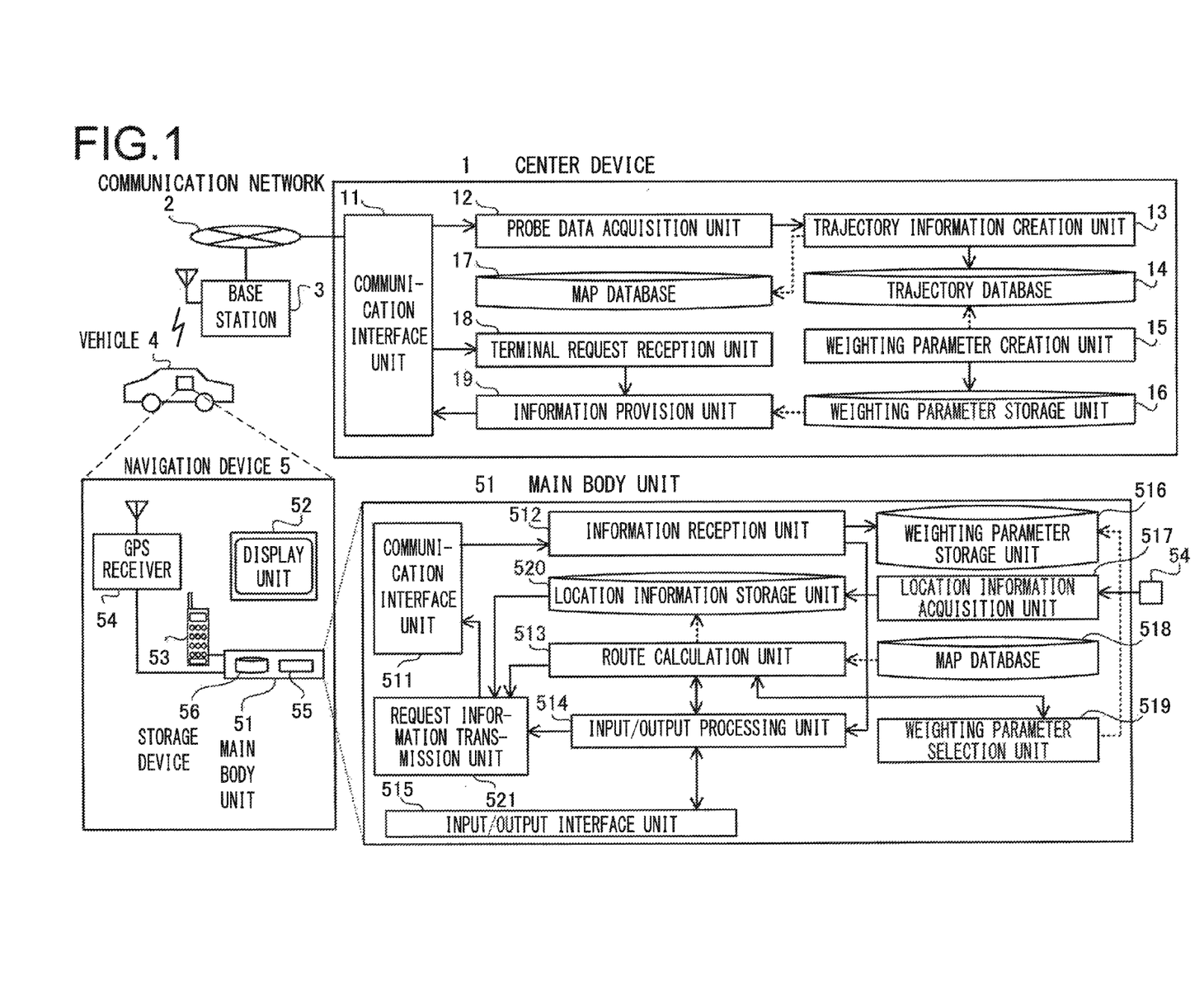
FIG. 1 is a diagram showing a whole construction of a route search system to which a center device and a navigation device according to an embodiment of the present invention are implemented.

FIG. 1 is a diagram showing a whole construction of the route search system according to an embodiment of the present invention. In the present embodiment, for example, a navigation device used as a terminal device and explanation is made thereon. In FIG. 1, a center device 1 according to the embodiment, which is connected to a communication network 2, is connected to a navigation device 5 mounted on a vehicle 4 via wireless communication through a base station 3 for a mobile phone or the like. For the simplicity of explanation, the vehicle 4 is assumed to have both a function of a probe car that creates probe data based on collected information and transmit the created probe data to the center device 1 and a function of a target vehicle for route guidance by using a recommended route based on a weighting parameter obtained by the processing described later depending on the probe data.

The center device 1 is constituted by a so-called computer (information processing device) that includes a CPU (Central Processing Unit), which is unshown, a memory device, a hard disk drive and so on. Functionally, the server device 1 includes function blocks such as a communication interface unit 11, a probe data acquisition unit 12, a trajectory information creation unit 13, a trajectory database 14, a weighting parameter creation unit 15, a weighting parameter storage unit 16, a map database 17, a terminal request reception unit 18, and an information provision unit 19, as shown in FIG. 1.

Note that the computer that constitutes the center device 1 includes at least an unshown calculation device and a storage device 56 such as a semiconductor memory or a hard disk drive. The function of each of the function blocks that constitute the center device 1 is implemented by execution by the CPU of a predetermined program stored in the unshown storage device.

The communication interface unit 11 exchanges data with the navigation device 5 via the communication network 2.

The probe data acquisition unit 12 acquires the probe data transmitted from the navigation device 5 via the communication interface unit 11. Here, the probe data is travel trajectory data of the probe car in the form of a sequence of points, which includes location information (coordinates such as latitude and longitude) representing a plurality of trajectories of a probe car and time information about time for which the probe car moves along the trajectories and so on. The probe data may include travel speed, direction of movement, and vehicle information such as brake information, of the probe car.

The trajectory information creation unit 13 matches the probe data in the form of the sequence of points acquired by the probe data acquisition unit 12 with the road links read in from the map database 17 to create trajectory information based on the road links and stores the created trajectory information in the trajectory database 14.

In some cases, a plurality of different routes may connect the same pair of points with each other and thus the trajectories connecting the same pair of points can be classified into the plurality of different routes. The weighting parameter creation unit 15 reads the trajectories connecting the same pair of points from the trajectory database 14, classifies the read-in trajectories by route and calculates probability in which each of the routes is selected, i.e., a route selection probability. It calculates various route attributes such as distance, amount of time required, road attribute and toll of each route. Further, it calculates weighting parameters representing the degrees of influences the various route attributes may have on the route selection probability described above, and stores the calculated weighting parameters in the weighting parameter storage unit 16. The weighting parameters are defined by a logistic regression expression (1) described later.

In some cases, the probe data acquisition unit 12 acquires the route that has been converted into road links and the trajectory that is converted into distance, amount of time required and speed via the communication interface unit 11. In this case, the trajectory information based on the road links is created at the navigation device 5 or an external information center (unshown) connected through the communication network 2 and then the created trajectory information is transmitted to the center device 1. In some cases, the probe data acquisition unit 12 acquires the probe data via a recording medium instead of the communication network 2.

The terminal request reception unit 18 receives request information transmitted from the navigation device 5 via the communication interface unit 11. The request information, which is transmitted by the navigation device 5 to the center device 1 for requesting provision of information, includes request information for requesting route information and request information for requesting weighting parameters according to the present embodiment.

The information provision unit 19 functions to provide information in response to the request information received by the terminal request reception unit 18; for any request information including a request for weighting parameters, it reads the then latest weighting parameters from the weighting parameter storage unit 16 based on the request information, and provides the latest weighting parameters acquired to the navigation device 5 though the communication interface unit 11. For any request information including designations of classification types such as area, date and time, vehicle type, and attributes of the driver along with the weighting parameter request, it acquires a weighting parameter for each of the designated classification types such as the area, the date and time, the vehicle type, and the attributes of the driver and provide it to the navigation device 5. Furthermore, for any request information including designation of the classification type, specified user, it acquires a weighting parameter corresponding to this classification type using the probe data obtained when the designated specified user has driven the vehicle.

On the other hand, the navigation device 5 mounted on the vehicle 4 includes a main body unit 51, a display unit 52, a mobile phone 53, a GPS (Global Positioning System) receiver 54 and so on.

The main body unit 51 is a computer that includes a calculation processing unit (unshown), a storage device 56, a portable storage medium connection adapter 55 and so on. Here, the storage device 56 includes a semiconductor memory, a hard disk drive and so on. The portable storage medium connection adapter 55 includes a disk drive such as a digital versatile disk (DVD) or a reader writer of a universal serial bus (USB) memory having incorporated a flash memory. The main body unit 51 may additionally include various input devices such as switches, buttons, a touch panel, a remote controller, and a sound microphone and various output devices such as a sound speaker. The input/output function of such an input device or an output device is designated as an input/output interface unit 515 in FIG. 1.

The display unit 52 includes, for instance, a liquid crystal display (LCD). The main body unit 51 wirelessly communicates with the base station 3 via the mobile phone 53 to enable data communication with the center device 1 via the base station 3 and the communication network 2. In addition, the GPS receiver 54 receives an unshown GPS satellite to detect the current location of the vehicle 4.

The main body unit 51 includes various function blocks such as a communication interface unit 511, an information reception unit 512, a weighting parameter storage unit 516, a location information acquisition unit 517, a location information storage unit 520, a route calculation unit 513, a map database 518, a weighting parameter selection unit 519, an input/output processing unit 514, an input/output interface unit 515 and so on. The function blocks of the main body unit 51 are implemented by execution of a predetermined program stored in the storage device 56 by the unshown CPU. The storage device 56 also includes a weighting parameter storage unit 516 that stores the weighting parameters described later, a location information storage unit 520 that stores the trajectory information and a map database 518 that stores map data of a map.

The communication interface unit 511 controls the communication of the mobile phone 53 and exchanges data with the center device 1 via the base station 3 and the communication network 2. Information inputted from an unshown switch, button, voice, touch panel or the like is inputted in the input/output interface unit 515. The input/output interface unit 515 receives display information including a map acquired by the route calculation unit 513 referring to the map database 518 and route information calculated by the route calculation unit 513, via the input/output processing unit 514 described later and then outputs the received display information to the display unit 52.

The input/output processing unit 514 makes an analysis as to whether the input information inputted from a switch, a button or the like, which is unshown in the figure via the input/output interface unit 515 is destination information or request information to the center device 1. Then, based on the result of this analysis, it sets various types of information.

The location information acquisition unit 517 acquires GPS information, such as latitude and longitude, altitude, and time information detected by the GPS receiver 54 and causes the acquired GPS information to be stored at the location information storage unit 520. In this case, location information acquisition unit 517 may acquire travel information such as brake information, operation information about operation of winkers, parking, steering or the like along with the location information and causes the acquired information to be stored as travel trajectory information in the position information storage unit 520.

The request information transmission unit 521 sends a request for weighting parameters used in the route calculation to the center device 1 when the navigation device 5 is powered on (at the start of a drive), when the route request is inputted by the input/output interface unit 515, or when the predetermined time is reached.

The information reception unit 512 receives various pieces of information including weighting parameters transmitted from the center device 1 via the communication interface unit 511. The information reception unit 512 causes the received weighting parameters to be stored in the weighting parameter storage unit 516.

The route calculation unit 513 reads in road network information from the map database 518 via the input/output interface unit 515 in response to the route search request set by the input/output processing unit 514 and calculates a recommended route from the point of departure to the destination of the vehicle 4. For calculating a recommended route, a minimum cost route based upon travel time or speed, distance and so on per road link is usually calculated by using a mathematical method such as Dijkstra's algorithm. Upon determination of the cost of a road link to be used in route calculation by using a plurality of road attributes such as travel time or distance, the respective values of the road attributes are adjusted with the weighting parameters selected by the weighting parameter selection unit 519 before the cost of the road link can be determined. For calculating a recommended route, the route calculation unit 513 acquires departure point information of the vehicle 4 based on, for instance, the location information stored by the location information storage unit 520 and also acquires destination information included in the route request set by the input/output processing unit 514. The route calculation unit 513 selects a route search area based on the acquired departure point information and the destination information.

The weighting parameter selection unit 519 reads in the departure point and the destination acquired by the route calculation unit 513 or the route search area selected by the route calculation unit 513 based on the departure point and the destination. Then it selects weighting parameters corresponding to the departure point and destination or the route search area among the weighting parameters stored at the weighting parameter storage unit 516. As described later referring to FIG. 4, the weighting parameters stored at the weighting parameter storage unit 516 relate each to a combination of a starting point and an ending point of the route. A set of weighting parameters relates to an identical combination of a starting point and an ending point or an almost identical combination of a starting point and an ending point. To select one set of weighting parameters among the weighting parameters stored in the weighting parameter storage unit 516, the weighting parameter selection unit 519 refers to the combinations of the starting and ending points relating to the respective sets of the weighting parameters and selects any particular one combination of the starting and ending points and thus the weighting parameters corresponding to the selected combination of the starting and ending points. To select any such particular one combination of the starting and ending points, the weighting parameter selection unit 519 selects the starting and ending points, for instance, as follows. For instance, the weighting parameter selection unit 519 selects starting and ending points related to those weighting parameters related to the weighting parameters in case that a distance (i.e., a direct distance) between the departure point and the destination is substantially equal to a distance (i.e., a direct distance between the starting and ending points) of the weighting parameters setting section related to the weighting parameters. The weighting parameter selection unit 519 selects, for instance, those starting and ending points in the same area as an area in which one or both of the departure point and the destination are located (meshes or prefectures) or in an area near such an area. The weighting parameter selection unit 519 selects, for instance, those starting and ending points in a peripheral area having substantially the same roughness of the road (such as node density, number of roads or number of links) as that of a predetermined area of the road including the departure point and the destination acquired by the route calculation unit 513 in response to the route request. The route calculation unit 513 calculates a recommended route from the departure point to the destination modified with the weighting parameters thus selected by the weighting parameter selection unit 519. Then the route calculation unit 513 outputs the calculated recommended route to the input/output interface unit 515 via the input/output processing unit 514 to display it at the display unit 52.

In FIG. 1, the route calculation unit 513 of the navigation device 5 calculates the recommended route up to the destination. However, the center device 1 may include a similar route calculation unit, which calculates a recommended route modified with the weighting parameters and provides the calculated recommended route to the navigation device 5 via the communication interface unit 11.

Although the information reception unit 512 of the navigation device 5 is configured to acquire weighting parameter from the center device 1 via the communication interface unit the 511, it may be configured to acquire the weighting parameters from a portable storage medium set at the portable storage medium connection adapter 55. As an alternative, a method may be adopted in which route calculation and display of a recommended route modified with the weighting parameters at the navigation device 5 is achieved by executing an application implemented at the mobile phone 53 or a portable computer.

(Process at the Center Device 11)

Figure 2:
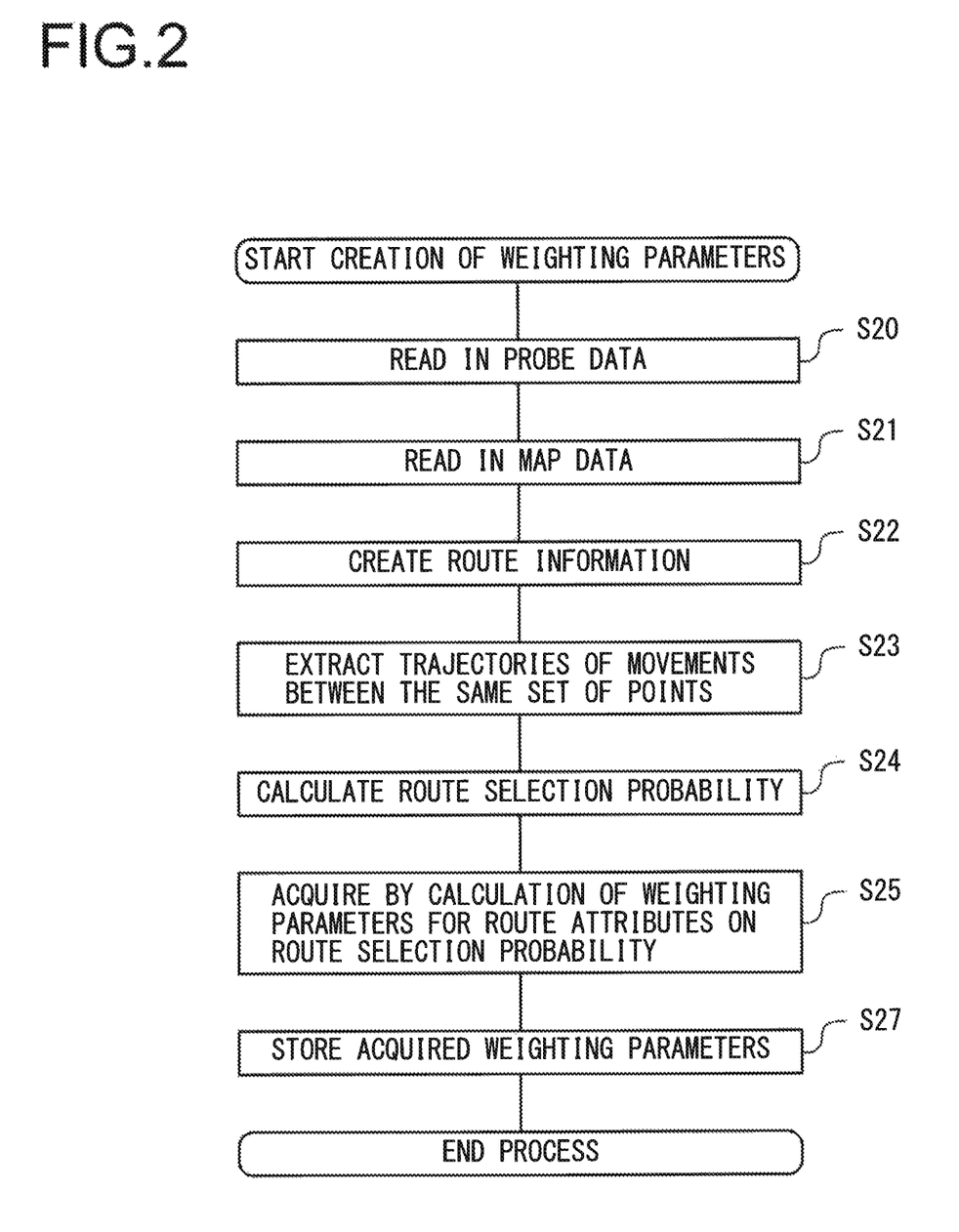
FIG. 2 is a flowchart illustrating a process for creating a weighting parameter at the center device.
Figure 3:
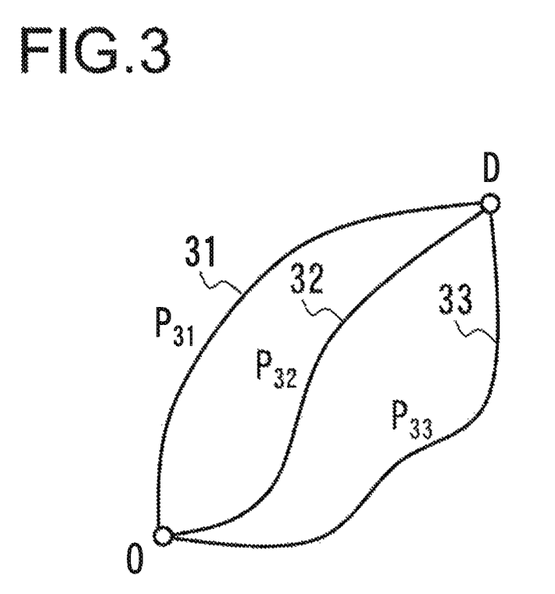
FIG. 3 is a supplementary explanation diagram explaining the process for creating the weighting parameter in FIG. 2.

FIG. 2 shows an example of the process at the center device 1 according to the present embodiment, in which the weighting parameters are created by using the collected probe data. FIG. 3 is a supplemental explanatory diagram illustrating the flow of the processing in FIG. 2.

The trajectory information creation unit 13 of the center device 1 starts weighting parameter creation process at the timing when the probe data acquisition unit 12 acquires the probe data or by a periodical process. Once the process is started, the trajectory information creation unit 13 reads in the probe data acquired by the probe data acquisition unit 12 (step S20) and also map data of the area from the map database 17 (step S21) based on the location information (latitude and longitude) of the probe data. The trajectory information creation unit 13 matches the probe data read in by the probe data acquisition unit 12 with the road links of the map data read in in order to create moving route (trajectory, probe route) consisting of a series of road links based on the probe data. It accumulates the created moving route in the trajectory database 14 (step S22). After the trajectory information creation unit 13 has created a trajectory from all the probe data acquired by the probe data acquisition unit 12, the weighting parameter creation unit 15 extracts trajectories connecting the same set of points (starting point O to ending point D in FIG. 3) from the trajectory database (step S23).

The weighting parameter creation unit 15 classifies a plurality of trajectories that pass through the same pair of points for each route, with treating trajectories that pass along any particular route as belonging to that particular route. It counts the number of times of usage of the route for which the trajectories are classified and calculates route selection probability for each route (step S24). For instance, in a case that as shown in FIG. 3, the trajectories of the movement from the starting point O to the ending point D are classified as belonging to any one of three routes 31, 32 and 33, the route selection probabilities $P_{31}$, $P_{32}$ and $P_{33}$ respectively corresponding to the routes 31, 32 and 33 are calculated. It is assumed that for instance, ten trajectories of the movements from the starting point O to the ending point D consist of five belonging to the route 31, three belonging to the route 32, and two belonging to the route 33. In this case, the route selection probability $P_{31}$ for the route 31 is obtained as a ratio of the number of the trajectories belonging to the route 31, i.e., "5" to the number of the trajectories of the movements from the starting point O to the ending point D, i.e., "10". That is, the value of the route selection probability $P_{31}$ is "5/10". The route selection probability $P_{32}$ for the route 32 is obtained as a ratio of the number of the trajectories belonging to the route 32, i.e., "3" to the number of the trajectories of the movements from the starting point O to the ending point D, i.e., 10. That is, the value of the route selection probability $P_{32}$ is "3/10". The route selection probability $P_{33}$ for the route 33 is obtained as a ratio of the number of the trajectories belonging to the route 33, i.e., "2" to the number of the trajectories of the movements from the starting point O to the ending point D, i.e., 10. That is, the value of the route selection probability $P_{33}$ is "2/10". To solve the system of equations by a substitution method, the selection probability $P_L$ for a route L (L=1, 2, 3, . . . ) and route attributes included in the probe data, for instance, distance (a sum of the lengths of links that constitute the route L) $x_1$, an amount of time required $x_2$, a type of road $x_3$, . . . and other route attributes $x_k$ are substituted into a logistic regression algorithm according to an expression (1). This provides weighting parameters $\alpha_0, \alpha_1, \alpha_2, \alpha_3$ through $\alpha_k$ for the route attributes, which represent degrees of influences on the route selection probability of the route corresponding to the set of the starting and ending points consisting of the starting point O and the ending point D (step S25). The weighting parameter $\alpha_0$ is an adjustment coefficient that gives no impact on the route attributes. The weighting parameter creation unit 15 stores the weighting parameters $\alpha_0, \alpha_1, \alpha_2, \alpha_3$, through $\alpha_k$ into the weighting parameter storage unit 16 (step S27).

[Math 1]

$$P_L = \left( \frac{\exp(\alpha_0 + \alpha_1 x_1 + \alpha_2 x_2 + \alpha_3 x_3 + \ldots + \alpha_k x_k)}{1 + \exp(\alpha_0 + \alpha_1 x_1 + \alpha_2 x_2 + \alpha_3 x_3 + \ldots + \alpha_k x_k)} \right) \quad (1)$$

(Examples of Weighting Parameter)

Figure 4:
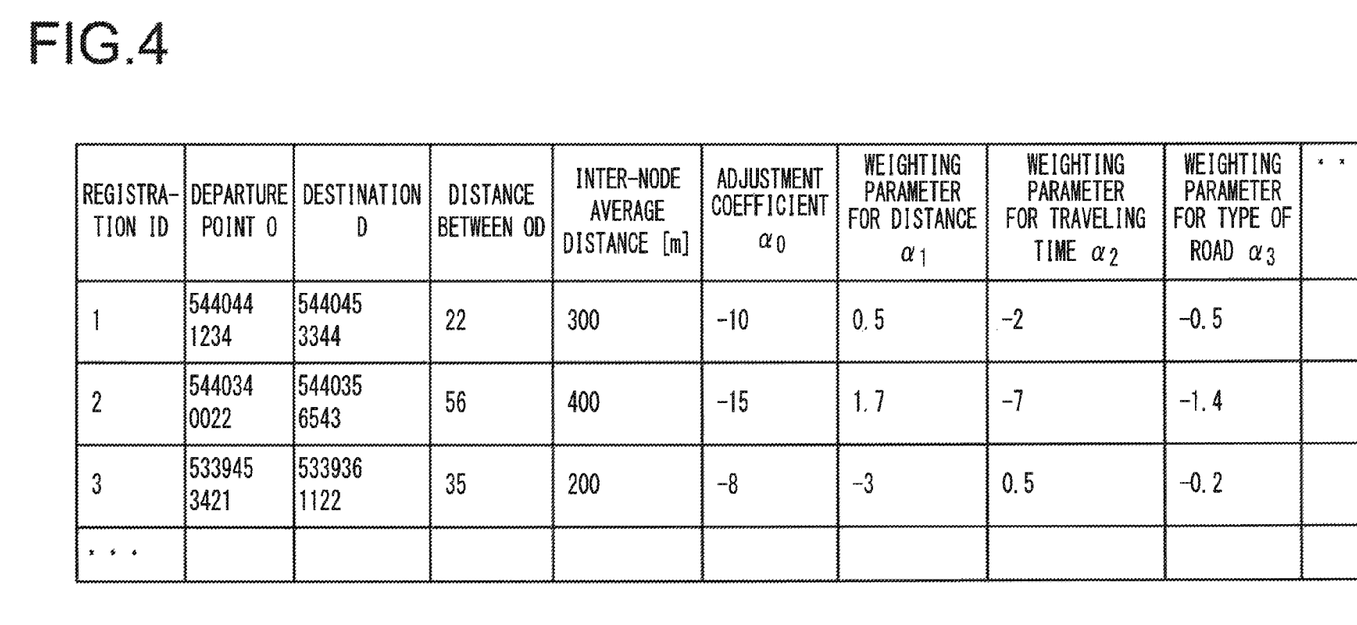
FIG. 4 is a diagram showing an example of the weighting parameter stored in a weighting parameter storage unit at the center device or the navigation device.

FIG. 4 shows examples of the weighting parameter stored in the weighting parameter storage unit 16. The weighting parameters are created based on all the collected probe data. However, as the amount of the collected probe data increases, a plurality of sets of weighting parameters of different types may be created as divided by type of day whether it is a weekday or a holiday or by time zone. To reflect the liking of the driver on the route selection, the weighting parameters are created based on the probe data collected for each driver. The weighting parameter storage unit 16 stores the weighting parameters $\alpha_0, \alpha_1, \alpha_2, \alpha_3$ through $\alpha_k$ calculated according to the expression (1) together with other pieces of information such as a registration ID, the starting point O and the ending point D of the weighting parameter creation section, a distance of the section between the starting point and the ending point (for instance, a direct distance between the starting point O and the ending points D), an inter-node average distance of road nodes present near the starting and ending points section (or a number of road nodes per unit area and/or a number of road links per unit area) and so on. The data used for representing the starting point O and the ending point D includes, for instance, IDs specific to nodes or IDs of areas in which the starting point O and the ending point D are present, respectively.

(Process at Navigation Device 5)

Figure 5:
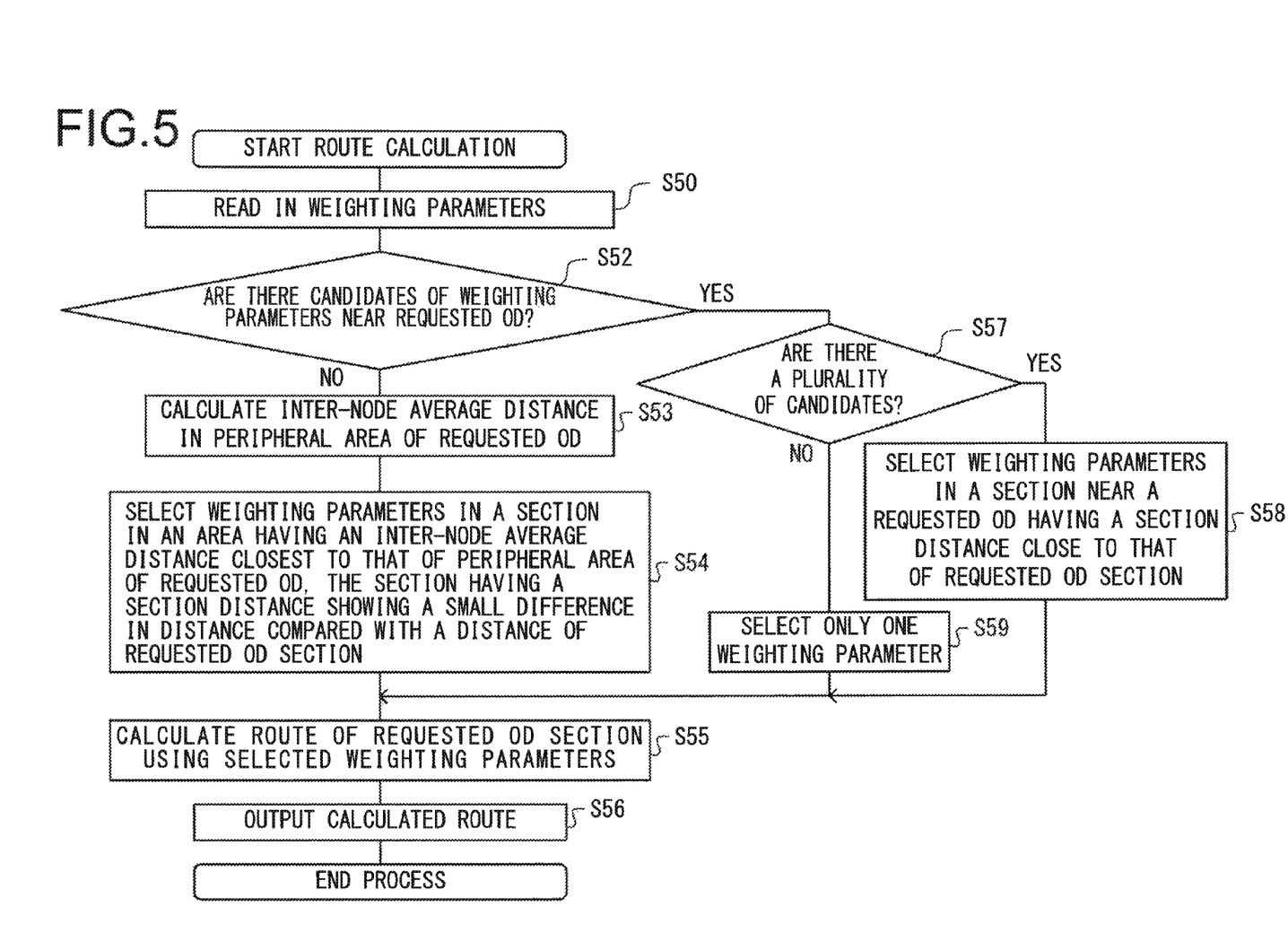
FIG. 5 is a flowchart illustrating processing for searching a guide route by using the weighting parameter at the navigation device.
Figure 6:
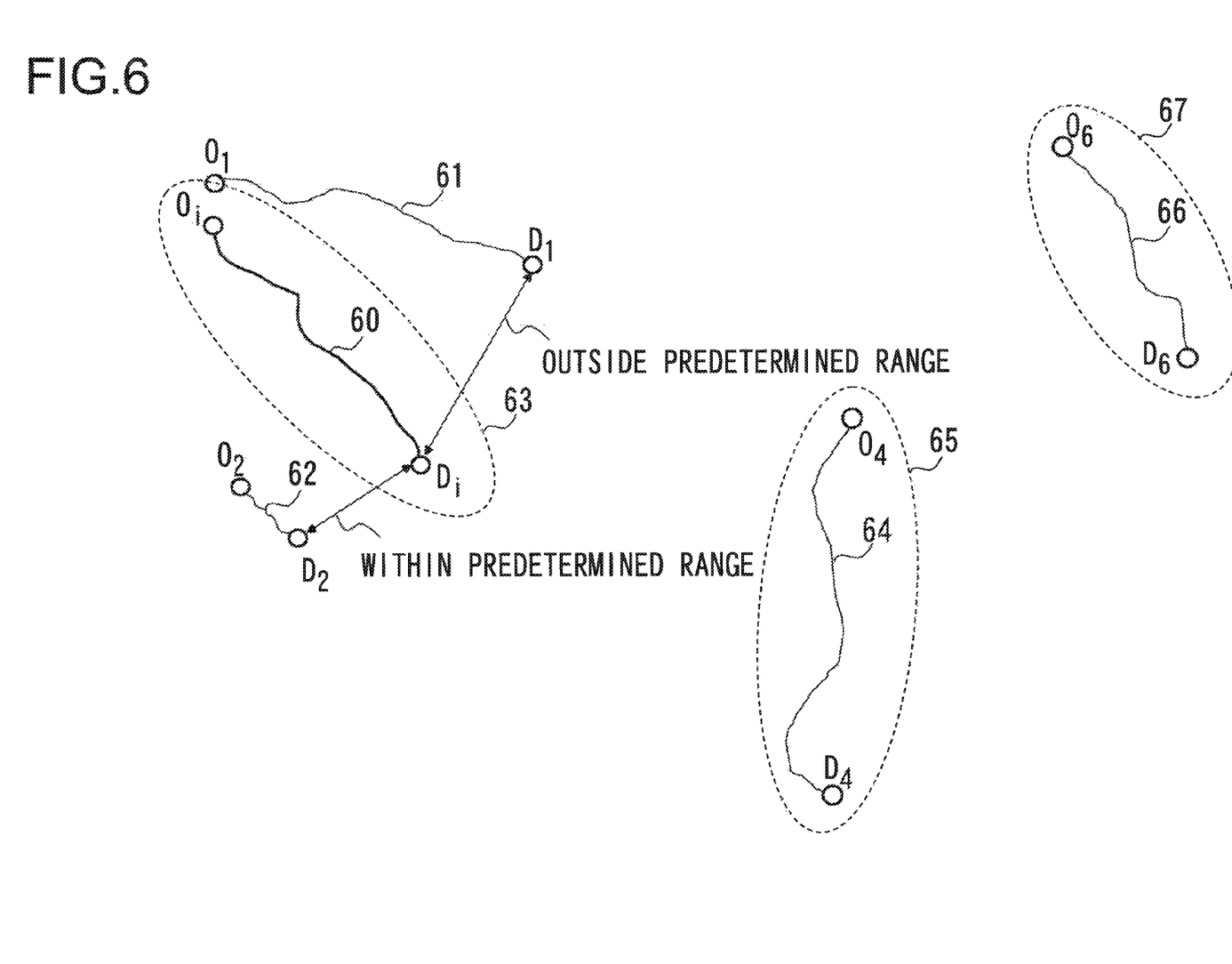
FIG. 6 is a supplemental explanation diagram explaining the route calculation processing in FIG. 5.

FIG. 5 shows an example of the process for searching a guide route by using the weighting parameters created from the probe data at the navigation device 5 according to this embodiment. FIG. 6 is a supplemental explanatory diagram for illustrating the process in FIG. 5.

The user inputs a departure point and a destination via the input/output interface unit 515 at the navigation device 5 and requests route search. This request information is transferred to the route calculation unit 513, which then starts a route calculation process. Upon start of the process, in which a current location acquired by the location information acquisition unit 54 may be used as a departure point, first the information reception unit 512 recognizes updating date and time of the weighting parameters stored in the weighting parameter storage unit 516. If a predetermined time has elapsed from the updated date and time, it sends a request for weighting parameters to the center device 1 via the communication interface unit 511. The information reception unit 512 receives latest weighting parameters from the center device 1 via the communication interface unit 511 and stores the received latest weighting parameters in the weighting parameter storage unit 516 (step S50). The information reception unit 512 searches weighting parameters related to the starting and ending points section located near the departure point O and the destination D (hereafter, referred to as "requested OD") included in the request information among the weighting parameters stored in the weighting parameter storage unit 516. If a candidate for a weighting parameter is present (YES in step S52) and such is the only one candidate (NO in step S57), the information reception unit 512 transfers the sole candidate for the weighting parameter to the route calculation unit 513 via the input/output processing unit 514. The route calculation unit 513 calculates a route for the requested OD section by using the sole weighting parameter which it has acquired (step S56). For any plurality of candidates (YES in step S57), the weighting parameter selection unit 519 selects a weighting parameter corresponding to a section, the section being located at a place near the requested OD and a distance between the starting and ending points of the section being closest to the distance of the requested section OD (step S58). The route calculation unit 513 calculates a route for the requested section OD by using the weighting parameter selected by the weighting parameter selection unit 519 (step S55). If there is no weighting parameter (NO in step S52), the weighting parameter selection unit 519 calculates an average distance between any two road nodes that are present in a peripheral area outside a predetermined area including the requested OD (step S53). The weighting parameter selection unit 519 selects, among the weighting parameters stored in the weighting parameter storage unit 516, a weighting parameter related to an inter-node average distance closest to that of a predetermined area including the requested OD section among the average distances between any two of the road nodes calculated in step S53. On this occasion, a plurality of weighting parameters may be selected. The weighting parameter selection unit 519 selects any particular combination of the starting and ending points from a plurality of combinations of the starting and ending points related to a plurality of weighting parameters, the distance between the starting and ending points of the particular combination being closest to the section distance of the requested OD, and then it selects a weighting parameter related to the selected particular combination of starting and ending points (step S54). The route calculation unit 513 reads out a map of an area that includes the requested OD from the map database 518 and reads in link costs such as link length, link travel time and link road width of each road link included in the map and calculates a route for the requested OD section by weighting the read-in link costs with the selected weighting parameters (step S55). The route calculation unit 513 outputs the searched route by this route calculation as a recommended route for the requested section to the input/output interface unit 515 via the input/output processing unit 514 (step S56) to bring the recommended route on display at the display unit 52.

The inter-node average distance in step S53 is an average of all the distances between any two nodes mutually connected with a link in an area of interest. The average inter-node distance is an index indicating a density of road. Hence, any index that enables comparison of the density of road, such as the number of road nodes per unit area or the number of road links per unit area, may be used in step S53 instead of the average inter-node distance.

In the selection of weighting parameters based on a location relationship of the requested OD executed in step S58 to the starting and ending points section related to the weighting parameters, the weighting parameter selection unit 519 compares a distance difference between the departure points of the requested OD section and the starting and ending points section with a distance difference between the destinations of the requested OD section and the starting and ending points section. Then, it selects the starting and ending points section of which any one of these differences is smallest and thus selects a weighting parameter related to the starting and ending points section at a place closest to the requested OD section. In this selection processing, both of the distance differences described above may be used. As an alternative, a distance difference between any point near a straight line connecting the starting and ending points of the request OD section and any point near straight line connecting the starting and ending points of the starting and ending points section may be used.

The route calculation in step S55 uses the weighting parameters to determine cost Ci of road link i from a plurality of cost factors as shown in the expression (2). The cost factors used herein include the same attributes as the route attributes (distance, amount of time required, road attributes and so on) adopted to give influences on the route selection in the creation of the weighting parameters. $\alpha_0$, $\alpha_1$, $\alpha_2$, $\alpha_3$, through $\alpha_k$ are the weighting parameters selected in step S54 and step S58. $x_{1(i)}$, $x_{2(i)}$, $x_{3(i)}$ through $x_{k(i)}$ are cost factors of road link i, that include attribute data such as distance, travel time, road attributes and so on. The route calculation unit 513 sets the cost of the road link, which is a target of the route search, according to the expression (2) and calculates a minimum cost route up to the destination O. A commonly used calculation algorithm for calculating the minimum cost route is a Dijkstra's method. However, any other algorithms for calculating a minimum cost route other than the Dijkstra's method may be used.

[Math 2]

$$C_i = \alpha_0 + \alpha_1 x_1(i) + \alpha_2 x_2(i) + \alpha_3 x_3(i) + \ldots \alpha_k x_k(i) \quad (2)$$

The process in steps S51 through S56 is explained supplementarily. It is assumed that in FIG. 6, a route from a departure point Oi to a destination Di is requested. To respond to this request, in step S51, the weighting parameters of the starting and ending points section $O_1D_1$ of the route 61 and the weighting parameters of the starting and ending points section $O_2D_2$ of the route 62 are selected as candidate parameters, the routes 61 and 62 being present in an area that is the same as or near a particular area in which the requested points Oi and Di are present. A plurality of weighting parameter candidates are present. Thus, in step S58, the weighting parameters related to a section that is located near the requested points Oi and Di and that has a direct distance close in value to the direct distance between the requested points (from Oi to Di) is selected. In the embodiment shown in FIG. 6, the weighting parameter related to the starting and ending points section $O_1D_1$, which includes the starting point $O_1$ closest to the requested point Oi and the distance of the starting and ending points section (i.e., direct distance between $O_1$ to $D_1$) is close in value to the direct distance between Oi and Di, is selected. In step S55, the weighting parameter related to the selected starting and ending points section $O_1D_1$ is used to calculate the route 60 from the departure point Oi to the destination Di. If the weighting parameter storage unit 516 stores none of the starting and ending points sections $O_1D_1$ and $O_2D_2$, an inter-node average distance in a peripheral area 63 near the requested points Oi and Di is calculated in step S53. In step S54, those weighting parameters having an inter-node average distance that is equal to the inter-node average distance of the peripheral area 63 or within a predetermined range therefrom are searched among the weighting parameters stored in the weighting parameter storage unit 516. Consequently, the weighting parameter of the starting and ending points section $O_4D_4$ of the route 64 and those of the starting and ending points section $O_6D_6$ of the route 66 are selected as the candidate parameters. In this case, the inter-node average distance of the starting and ending points section $O_4D_4$ is an average distance between the road nodes in the peripheral area 65 near the starting and ending points section $O_4D_4$. In addition, the average distance between the inter-node average distance of the starting and ending points section $O_6D_6$ is an average distance between the road nodes in the peripheral area 67 near the starting and ending points section $O_6D_6$, which is calculated upon creating weighting parameters at the weighting parameter creation unit 15 of the center device 1 and which is stored in the weighting parameter storage unit 16 along with the weighting parameter. For any plurality of weighting parameter candidates, the weighting parameter selection unit 519 compares a difference between the section distance of the starting and ending points section $O_4D_4$ and the section distance of the requested OD with a difference between the section distance of the starting and ending points section $O_6D_6$ and the requested OD. Then, it selects a weighting parameter related to the start and end points section $O_4D_4$ having the smallest difference in distance. In step S55, the route calculation unit 513 calculates the route 60 from the departure point Oi to the destination Di by using the selected weighting parameter of the starting and ending points section $O_4D_4$. The calculated route 60 is outputted as a recommended route for the request section.

In this embodiment, explanation is made on a method which involves acquiring the weighting parameters from the probe data collected, using them to set cost of the road link and calculating a minimum cost route up to the destination. Calculating a cost for each route by using the weighting parameters and then selecting a minimum cost route gives the same effect. More particularly, this method involves calculating a plurality of routes for movement in the requested section OD with changing the cost factors, such as distance or amount of time required, used for the route calculation, further calculating route costs by coupling route attribute data pieces, such as distances and travel times of the obtained routes with the weighting parameters selected in step S54 or step S58, and then selecting a route having a minimum route cost among the various obtained routes as a recommended route.

(Whole Process)

Figure 7:
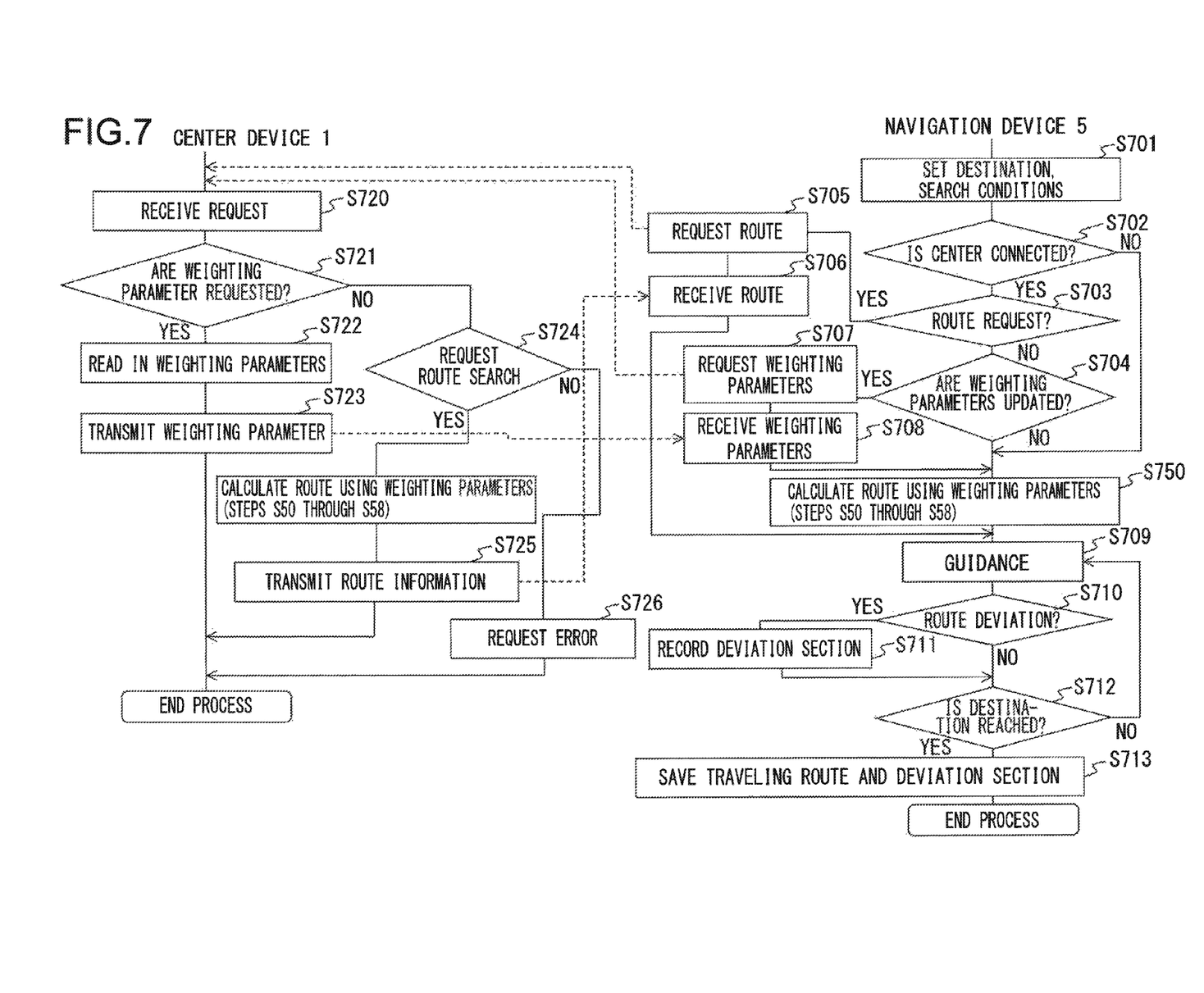
FIG. 7 is a flowchart illustrating the total process of creating the weighting parameter from the probe data and executing route calculation by using the created weighting parameter at the center device and the navigation deice that constitute the route calculation system.

FIG. 7 shows a flowchart of the whole process at the route search system including the center device 1 and the navigation device 5.

At the navigation device 5, the location information acquisition unit 517 acquires a current location as a departure point and the input/output processing unit 514 receives input such as destination and route search conditions via the input/output interface unit 515 (step S701). Then, if connection to the center device 1 is enabled (YES in step S702), the request information transmission unit 521 sends, to the center device 1, a request for information needed for providing a guide route from the departure point to the destination requested according to the inputted information acquired from the location information acquisition unit 517 and the input/output processing unit 514. Here, the navigation device 5 according to the present embodiment is assumed to have two functions, i.e., a function of requesting route information to the center device 1 and a function of requesting weighting parameters necessary for route calculation to the center device 1. For any inputted information acquired by the request information transmission unit 521 that requests for route information of the center device 1 (YES in step S703), the request information transmission unit 521 requests route information to the center device 1 via the communication interface unit 511 (step S705). In this case, the center device 1 is assumed to have a route calculation unit similar to the route calculation unit 513, although such is unshown.

At the center device 1, the terminal request reception unit 18 receives various pieces of request information from the navigation device 5 via the communication interface unit 11 (step S720), interprets requests contained in the received pieces of request information, and assigns the interpreted requests to appropriate processing units in the center device 1. For any request for route information (YES in step S724), the route calculation unit (unshown) provided in the center device 1 executes the route calculation process in steps S50 through S58 using the weighting parameters to calculate the requested route from the departure point to the destination. The information provision unit 19 transmits the route information obtained by the unshown route calculation unit to the navigation device 5 via the communication interface unit 11 (step S725).

At the navigation device 5, the information reception unit 512 receives route information from the center device 1 via the communication interface unit 511 (step S706) and, based on the route information received by the information reception unit 512, the input/output processing unit 514 starts guidance via the input/output interface unit 515 (step S709). During the route guidance, it detects whether the vehicle has deviated from the guide route (step S710) and for any deviation detected, it records the section in which such a deviation has occurred (step S711). When the vehicle 4 has arrived at or near the destination (YES in step S712), it saves the whole travel route including the route along which the vehicle 4 actually traveled as a result of deviation along with any deviated section if the deviated section exists (step S713). After the saving, the guidance ends, and the process ends.

For any input information acquired by the request information transmission unit 521 at the navigation device 5 requesting for a weighting parameter to the center device 1 (YES in step S704), the request information transmission unit 521 requests for a weighting parameter to the center device 1 via the communication interface unit 511.

At the center device 1, the terminal request reception unit 18 receives the request information from the navigation device 5 (step S720). If the request information includes a request for a weighting parameter (YES in step S721), the information provision unit 19 reads in the weighting parameter of the requested area from the weighting parameter storage unit 16 (step S722) and the information provision unit 19 transmits this weighting parameter to the navigation device 5 via the communication interface unit 11 (step S723).

At the navigation device 5, the input/output processing unit 514 receives the weighting parameter from the center device 1 via the input/output interface unit 515 (step S708), the route calculation unit 513 calculates the route from the designated departure point to the designated destination using the weighting parameter acquired from the input/output processing unit 514 according to the route calculation process in steps S50 through S58. The process in steps S709 through S713 for guiding the vehicle to the destination based on the obtained route as a recommended route is as described earlier. In, step S702, for any failure of connection of the navigation device 5 to the center device 1, the route calculation unit 513 reads in an existing weighting parameter stored in the weighting parameter storage unit 516 and executes the process in steps S50 through S58 by using the read in weighting parameter to calculate a route to the destination.

The weighting parameter creation unit 15 collects various pieces of probe data created by the navigation device 5 upon traveling of a number of probe cars including the vehicle 4 and creates weighting parameters based on the collected probe data. For instance, it collects probe data collected in step S713 that includes probe data in the deviation area and creates, based on the collected probe data, a weighting parameter, which is to be used for route calculation. This enables the calculation of a route that reflects the driver's intension to select better than ever. Use of the probe data collected when no route guidance is executed instead of the probe data including the probe data collected at a deviated section from the route would provide similar effect because the probe data contains probe data for many routes intentionally selected by the driver.

(Display Examples)

Figure 8:
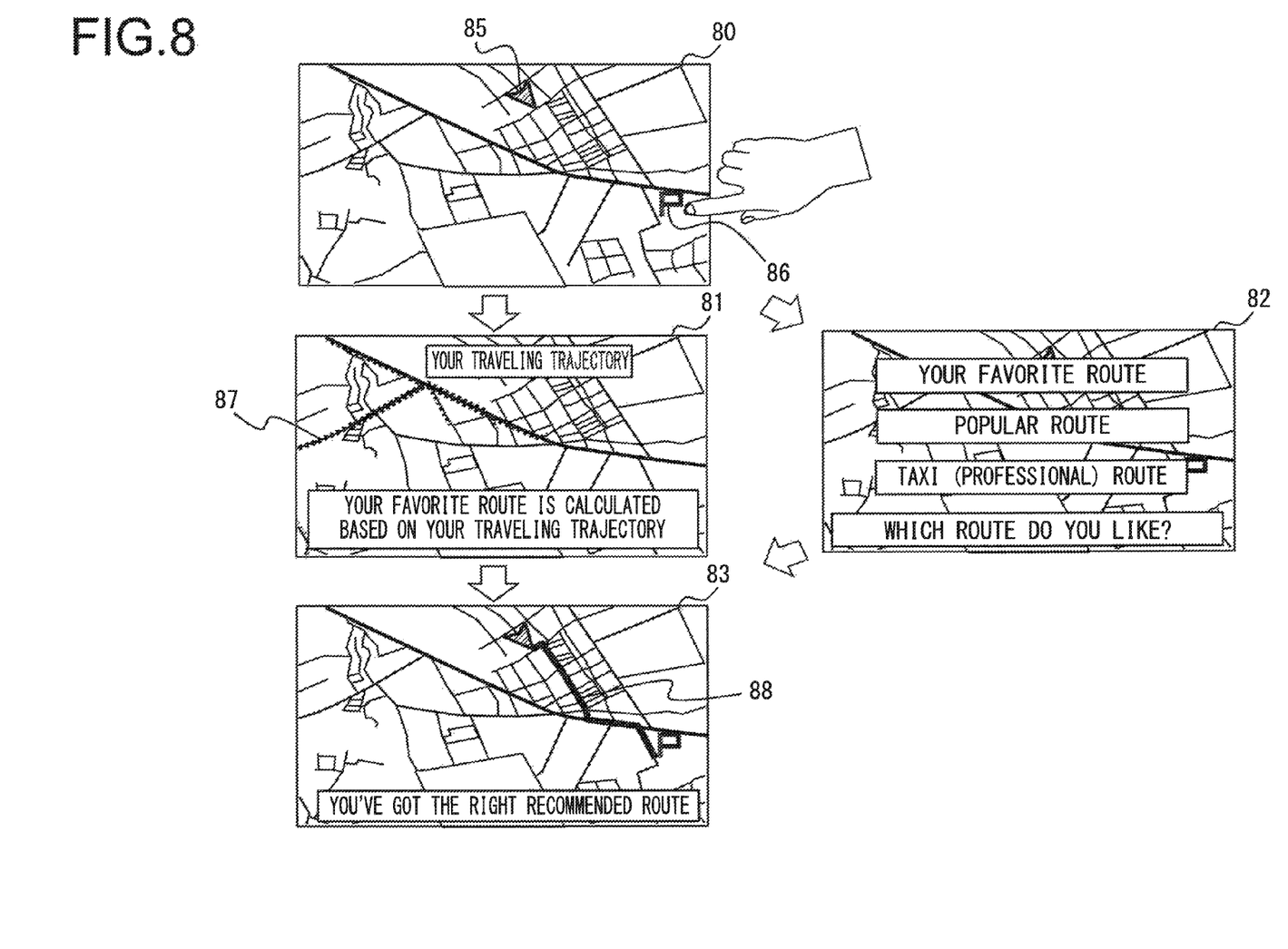
FIG. 8 is a diagram showing an example of a display screen that is brought on display at the display unit when a recommended route is obtained at the navigation device.

FIG. 8 shows examples of a display screen that is brought on display at the display unit 52 before a guide route is obtained at the navigation device 5.

A display screen 80 displays the current location 85 of the vehicle and the destination 86 set by the user on a map. Once the destination 86 is set, the screen transitions to the display screen 82, which displays route menus such as "YOUR FAVORITE ROUTE", "POPULAR ROUTE", and "TAXI DRIVER'S (PROFESSIONAL) ROUTE". Any one of the routes is calculated by using the weighting parameter created by the weighting parameter creation unit 15 based on the collected probe data. The route menu "YOUR FAVORITE ROUTE" uses the weighting parameter calculated based on the probe data obtained upon driving by the driver himself. "POPULAR ROUTE" uses the weighting parameter calculated based on a large indefinite number of the probe data. "TAXI DRIVER'S (PROFESSIONAL) ROUTE" uses the probe data of the taxi vehicles. In addition, creation of weighting parameters by classifying probe data by vehicle type or driver's attribute, such as truck driver, electric vehicle, and driver's age, enables many kinds of routes to be provided.

If "YOUR FAVORITE" is selected at the display screen 82, the screen transitions to the display screen 81 and the route calculation using the weighting parameter created from the probe data 87 of the driver's own starts. Upon completion of the route calculation, the screen transitions to the display screen 83; this displays the obtained route 88, and the route guidance to the destination starts. Use of the weighting parameter created from the probe data 87 enables the route 88 to be provided, which makes use of the route selection know-how of the probe data 87 for any area where the driver has no experience of traveling in the past. The display screen 82 may be configured to be brought on display upon initial setting. This allows the driver to set in advance a prioritized route in the route menus displayed on the display screen 82. In this case, after the destination 86 is inputted at the display screen 80, the screen transitions to the display screen 83 to display the recommended route 88, with skipping the display screens 82 and 81. This simplifies the operational process to be executed before the start of guidance and enables input operation for a short period of time. Thus, safety increases and operational stress on the driver is reduced, during traveling.

According to the present embodiment described above, the center device 1 calculates the weighting parameters based on the route selection probabilities obtained from the probe data collected and provides a calculated weighting parameter to the navigation device 5, which then calculates the route in the designated section based on the weighting parameter. This enables the user who has no experience of traveling in an area to make use of a practical route coupled with the route selection know-how of drivers who have traveled in the area in the past. This also enables the route selection know-how to be provided to the navigation device 5 as a weighting parameter, which may be used for areas where no past records of traveling besides the user above described are available. Accordingly, the present embodiment enables a route to be provided which is close to the user's expectation for a relatively broad area in spite of a limited amount of collected probe data and a limited collection area for collecting the probe data. In addition, providing a route along which the user may travel at high possibilities eliminates needs for the user causing the route calculation system to recalculate the route with changing route search conditions or to modify the route by setting a waypoint, so as to change a section undesirable to the user in the guide route. This enables a guide route to be provided, causing the user to feel less impact on the operability of the system.

The embodiments and their variations are explained above. However, the present invention is not limited to their contents. Various modifications can be made without departing from the scope of the invention.

The disclosure of the following priority application is herein incorporated by reference: Japanese Patent Application No. 2012-178785 (filed Aug. 10, 2012).

REFERENCE SIGNS LIST 1 center device
2 communication network
3 base station
4 vehicle
5 navigation device
11 communication interface unit
12 probe data acquisition unit
13 trajectory information creation unit
14 trajectory database
15 weighting parameter creation unit
16 weighting parameter storage unit
17 map database
18 terminal request reception unit
19 information provision unit
51 main body unit
52 display unit
53 mobile phone
54 GPS receiver
55 portable storage medium connection adapter
56 storage device
511 communication interface unit
512 information reception unit
513 route calculation unit
514 input/output processing unit
515 input/output interface unit
516 weighting parameter storage unit
517 location information acquisition unit
518 map database
519 weighting parameter selection unit
520 location information storage unit
521 request information transmission unit

The invention claimed is:

1. A route calculation system, comprising:
a route selection probability calculation unit that calculates a route selection probability of each route of a plurality of routes based on a number of trajectories included in the each route among a plurality of trajectories corresponding to probe data and based on a number of trajectories each having a starting point and an ending point which are substantially identical with a starting point and an ending point of the each route, among the plurality of trajectories;
a weighting parameter acquisition unit that acquires at least two kinds of weighting parameters based on a route traveling distance and a route traveling time along each of the routes, the route traveling distance and the route traveling time being obtained based on the probe data, and based on the route selection probability, the at least two kinds of the weighting parameters representing degrees of influences of at least the route traveling distance and the route traveling time on the route selection probability, for each of a plurality of sets of starting point and ending point combinations;
a weighting parameter selection unit that selects at least two kinds of weighting parameters corresponding to a specified set of a starting point and ending point combination related to a combination of a departure point and a destination among the plurality of sets of starting point and ending point combinations each related to the at least two kinds of weighting parameters; and
a recommended route calculation unit that calculates a recommended route based on at least two kinds of link costs including a link traveling distance and a link traveling time related to each road link of a plurality of road links in an area that includes the departure point and the destination and based on the at least two kinds of weighting parameters selected by the weighting parameter selection unit corresponding to the specified set of the starting point and ending point combination.

2. A route calculation system according to claim 1, further comprising:
a starting point and ending point combination selection unit that selects the specified set of the starting point and ending point combination based on a distance between two points of the departure point and the destination among the plurality of sets of the starting point and ending point combinations corresponding to
a plurality of routes each having a starting point and an ending point, at least one of which points is within a predetermined range from at least one of the departure point and the destination and
a plurality of routes included in a specified area that is any of at least one peripheral area outside a predetermined area, the predetermined area including the departure point and the destination and a plurality of nodes at a first node density, the specified area including a plurality of nodes at a second node density substantially equal to the first node density, wherein
the weighting parameter selection unit selects the at least two kinds of the weighting parameters corresponding to the specified set of the starting point and ending point combination selected by the starting point and ending point combination selection unit.

3. A route calculation system according to claim 2, wherein the first node density and the second node density are substantially equal to each other if
an average value of inter-node distances between any two nodes connected to each other by the each road link among the plurality of nodes included in the predetermined area is substantially equal to an average value of inter-node distances between any two nodes connected to each other by the each road link among the plurality of nodes included in the peripheral area.

4. A route calculation system according to claim 1, wherein the probe data includes
location information of the trajectories,
time information of the trajectories, and
classification information representing at least one of classes of a type of vehicle and an attribute of a driver,
the route selection probability calculation unit calculates the route selection probability for each specified type of class included in the at least one of classes by using a part of pieces of the probe data corresponding to the each specified type of class, and
the weighting parameter acquisition unit acquires the at least two kinds of weighting parameters for the each specified type of class by using the part of the pieces of the probe data.

5. A route calculation system according to claim 1, wherein the weighting parameter acquisition unit acquires the at least two kinds of weighting parameters based on deviation area information indicating deviation of a vehicle from a guide route, the route traveling distance and the route traveling time, and the route selection probability.

6. A route calculation system according to claim 1, wherein
for any first starting point of a first trajectory located near a second starting point of a second trajectory, both the first starting point and the second starting point are replaced with a representative starting point corresponding to the first starting point and the second starting point, and
for any first ending point of the first trajectory located near a second ending point of the second trajectory, both the first ending point and the second ending point are replaced with a representative ending point corresponding to the first ending point and the second ending point,
to yield a representative trajectory from the representative starting point to the representative ending point, and
each of the first trajectory and the second trajectory is replaced with the representative trajectory.

7. A route calculation system according to claim 2, further comprising:
a center device; and
a navigation device, wherein
the center device includes
the route selection probability calculation unit, and
the weighting parameter acquisition unit,
the navigation device includes
the weighting parameter selection unit,
the link cost read in unit,
the recommended route calculation unit, and includes
a weighting parameter reception unit that receives through communication the at least two kinds of weighting parameters acquired by the weighting parameter acquisition unit for the each route of the plurality of routes,
a storage device that stores the at least two kinds of weighting parameters acquired for each starting point and ending point combination of the each route and a map, and
a starting point ending point combination selection unit that reads out the at least two kinds of weighting parameters stored in the storage device and selects the specified set of the starting point and ending point combination based on the at least two kinds of weighting parameters read out, and
the recommended route calculation unit calculates the recommended route based on adjusted link costs adjusted by weighting the at least two kinds of link costs with the at least two kinds of weighting parameters corresponding to the specified set of the starting end and ending end combination.

8. A navigation device that constitutes the route calculation system according to claim 7.

9. A route calculation method, comprising:
calculating a route selection probability for each route of a plurality of routes based on a number of trajectories included in the each route among a plurality of trajectories corresponding to probe data and based on a number of trajectories each having a starting point and an ending point which are substantially identical with a starting point and an ending point of each of the each route, among the plurality of trajectories;
acquiring at least two kinds of weighting parameters based on a route traveling distance and a route traveling time along each of the routes, the route traveling distance and the route traveling time being obtained based on the probe data, and based on the route selection probability, the at least two kinds of weighting parameters representing degrees of influences of at least the route traveling distance and the route traveling time on the route selection probability, for each of a plurality of sets of starting point and ending point combinations;
selecting at least two kinds of the weighting parameters corresponding to a specified set of a starting point and ending point combination related to a combination of a departure point and a destination among the plurality of sets of starting point and ending point combinations each related to the at least two kinds of weighting parameters; and
calculating a recommended route based on at least two kinds of link costs including a link traveling distance and a link traveling time related to each road link of road links in an area that includes the departure point and the destination and based on the at least two kinds of the weighting parameters selected corresponding to the specified set of the starting point and ending point combination.

* * * * *